April 14, 1959 J. H. EAGLE 2,881,659
PHOTOGRAPHIC VIEWING APPARATUS
Filed Dec. 7, 1956 2 Sheets-Sheet 1

John Howard Eagle
INVENTOR.
BY
ATTORNEYS

April 14, 1959     J. H. EAGLE     2,881,659
PHOTOGRAPHIC VIEWING APPARATUS

Filed Dec. 7, 1956     2 Sheets-Sheet 2

John Howard Eagle
INVENTOR.

United States Patent Office 2,881,659
Patented Apr. 14, 1959

2,881,659

PHOTOGRAPHIC VIEWING APPARATUS

John Howard Eagle, Rochester, N.Y., assignor to Eastman Kodak Company, Rochester, N.Y., a corporation of New Jersey Application December 7, 1956, Serial No. 626,890

6 Claims. (Cl. 88—24)

This invention relates to photographic viewing apparatus and more particularly to an apparatus for viewing the projected images of documents recorded on photographic film strip.

In viewing microfilmed documents, it is frequently necessary to transversely reposition the film strip with respect to the optical projection system in order to properly orient a given document image on the viewing screen. This need is particularly noted when viewing the projected images of checks or other documents which have been photographically recorded on microfilm in such a way that the images of both the obverse and reverse sides thereof appear in end-to-end relation transverse of the film strip. Many systems have been devised for transversely moving the film strip with respect to the optical projection system, which is hereinafter referred to as scanning the film strip. In those instances where the optical system is moved with respect to the film strip, great difficulty is encountered in maintaining the movable optics in a position such that the projected image remains in proper focus throughout the complete scanning range. The more common method of obtaining the desired scanning in photographic viewing apparatus has been to move the film strip transversely with respect to the projection optics which are fixed in position. The difficulty so often encountered in utilizing this arrangement has also been one of maintaining the projected image in proper focus throughout the complete scanning range because of the failure of the mechanical parts to remain in exact adjustment during use. A further disadvantage in the utilization of either construction is the relatively high expense required to satisfactorily make, assemble and maintain the many complex parts. The development of the present invention was the result of an attempt to avoid these disadvantages of the known prior art and comprises broadly flexure means operatively connected to a film gate for imparting a scanning deflection to the film gate with respect to an optical projection system and means for selectively imparting deflections of a desired magnitude to the flexure means.

The primary object of the present invention is, therefore, to provide in a photographic viewing apparatus having an optical projection system and a film gate, flexure means operatively connected to the film gate for imparting a scanning deflection to the gate with respect to the projection system and in response to a deflection of the flexure means, and means for selectively imparting deflections to the flexure means.

Another object of the present invention is to provide in a photographic viewing apparatus having an optical projection system, flexure means for supporting a film gate with respect to the stationary optical projection system in a manner which permits the film gate to be moved with respect to the projection system through the complete scanning range of the viewing apparatus without affecting the focus of the projected image.

Still another object of the present invention is to provide in a photographic viewing apparatus having an optical projection system, an efficient and relatively inexpensive means for scanning the photographically recorded images on a film strip.

Other objects and advantages of the present invention will become readily apparent to those skilled in the art from the following description with reference to the drawing in which like characters denote like parts and wherein.

Figure 1:
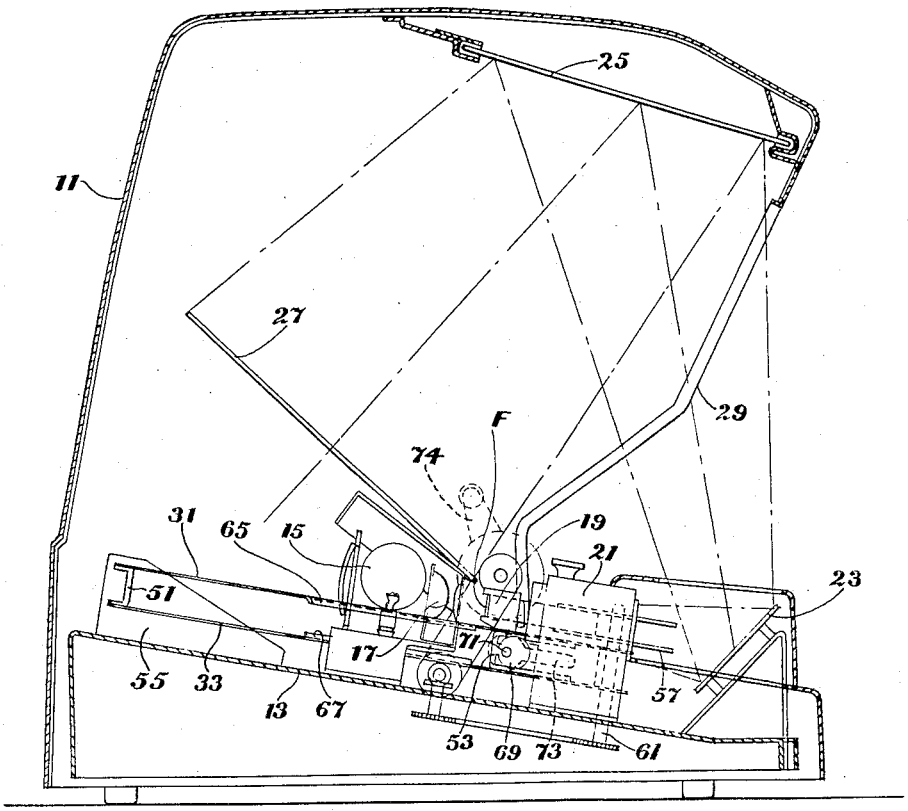
Fig. 1 is a cross sectional view of a photographic viewing apparatus embodying the present invention.
Figure 2:
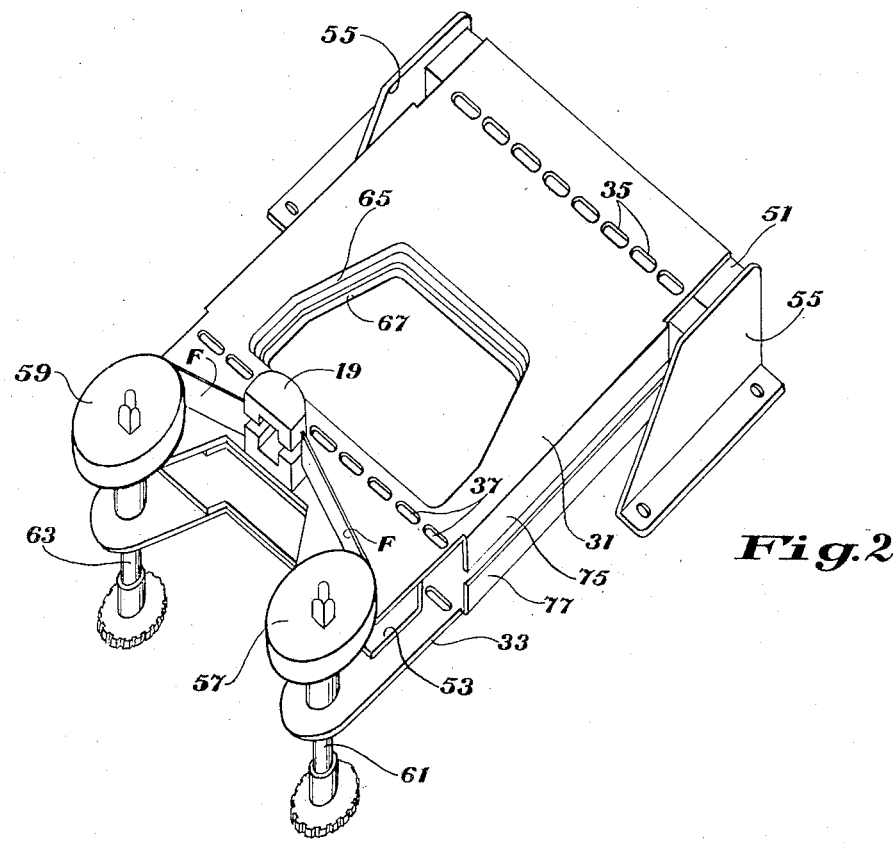
Fig. 2 and Fig. 3 are further views illustrating the flexure means as utilized in the present invention to obtain the desired scanning of photographically recorded images on film strip.
Figure 3:
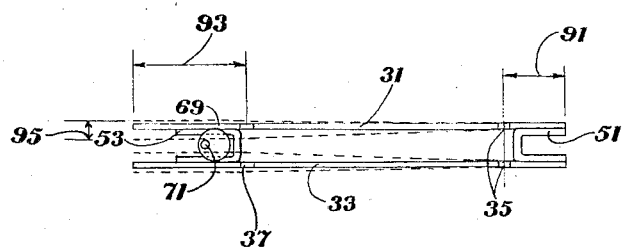

The viewing apparatus embodying the present invention as illustrated in Fig. 1 comprises a housing 11 with a base plate 13 mounted in the lower portion thereof. The optical projection system comprises the reinforced light source 15, condenser lenses 17, film gate 19, lens housing 21 which contains the projection lenses (not shown), a small reflecting mirror 23, a large reflecting mirror 25 and the viewing screen 27. Source 15, lenses 17, housing 21 and mirror 23 are rigidly mounted in optical alignment on the base plate 13 in a conventional manner. Mirror 25 is supported in the upper portion of the housing 11 to direct the projected images received from mirror 23, onto the screen 27 which is mounted within housing 11 above base plate 13. The screen 27 is positioned for convenient viewing by the operator through the large aperture 29 in the front wall of the housing 11. Film gate 19 is mounted on upper flexure plate 31 at a position forward of the line of flexure of the plate and between the condenser lenses 17 and the projecting lenses in the lens housing 21. Lower flexure plate 33 is identical to flexure plate 31, each being formed with a series of openings 35 and 37 which serve to weaken the flexure plates along the lines of flexure as is best illustrated in Figs. 2 and 3. The flexure plates 31 and 33 are spaced and rigidly joined in parallel relation by means of parallel U-shaped channels 51 and 53 which are of equal width. Channel 51 is mounted on support brackets 55 which are rigidly mounted on the base plate 13. The film reels 57 and 59 are supported on spindles 61 and 63 respectively which are carried on the forward ends of flexure plates 31 and 33. The large openings 65 and 67 are provided in flexure plates 31 and 33 respectively to permit the reinforced light source 15 and condenser lenses 17 to be conveniently mounted on base plate 13 without interfering with the movement of the flexure plates during scanning of the film strip in the film gate 19. The scanning movement is obtained by means of two identically shaped cams 69 which are eccentrically mounted on shaft 71 which is actuated by the handle 73 mounted on the exterior of the housing 11 as shown in Fig. 1. Cams 69 are of sufficient diameter to engage the inside surfaces of the flexure plates 31 and 33 so that when the handle 73 is rotated, the forward portion of the flexure plates which carry the reels 57 and 59 and the film gate 19, is raised or lowered with respect to the base plate 13 and is moved laterally with respect to the projecting lenses of the optical system to provide the desired scanning movement. The film strip F is advanced through the viewing apparatus from reel 57 to reel 59 by means of the hand crank 74 (Fig. 1) which drives spindles 61 and 63 through a suitable chain and sprocket system. Because of the hinged parallelogram type of flexure obtained from the utilization of the disclosed flexure plates, the projected image is always maintained in focus through the complete scanning range.

The flexure plates 31 and 33 are reinforced by suitable flanges 75 and 77 respectively to prevent bending, except along the portions of the flexure plates weakened by the openings 35 and 37. Thus as illustrated in Fig. 3, the area of the flexure plates indicated by arrow 91 is fixed with respect to the base plate 13 and is parallel to the surface thereof. The area of the flexure plates indicated by the arrow 93 moves through the scanning range but remains parallel to the plane of the base plate 13 and to the surface of the plane indicated by the arrow 91. The solid lines in Fig. 3 indicate the neutral position of the flexure plates 31 and 33 at which time the center of the aperture in the film gate 19 is aligned with the optical axis of the projecting system, and the dotted lines in Fig. 3 indicate the position of the flexure plates at the extreme limits of the scanning range. Thus the distance indicated by the arrow 95 represents the scanning range of the viewing apparatus.

While only one embodiment of the present invention has been specifically described, many modifications and variations thereof are possible and will be readily apparent to those skilled in the art from the foregoing description which is, therefore, intended to be illustrative only and the scope of the invention is defined in the appended claims.

Having now particularly described my invention what I desire to secure by Letters Patent of the United States and what I claim is:

1. In photographic viewing apparatus having an optical projection system mounted on a supporting frame, a film gate for receiving a photographically recorded image for projection and having an aperture, the center of said aperture when said film gate is in a neutral position being aligned with the optical axis of said projection system, flexure means comprising two parallel plates, first spacing means interconnecting said plates adjacent one end of said plates and second spacing means interconnecting said plates intermediate said one end of said plates and the other end thereof, said one end of said plates being rigidly mounted to said supporting frame and said other end of said plates supporting said film gate in line with said optical axis and imparting scanning deflections to said gate from said neutral position in response to deflections of said flexure means, and means for selectively imparting deflections of a desired magnitude to said other end of said plates, said scanning deflections defining a surface which is substantially perpendicular to said optical axis.

2. In a photographic viewing apparatus having an optical projection system mounted on a supporting frame, a film gate for receiving a photographically recorded image for projection and having an aperture, the center of said aperture when said film gate is in a neutral position being aligned with the optical axis of said projection system, means for moving a film strip past said aperture in said gate and comprising two spindles, one for receiving a supply spool for a film strip and the other for receiving a storage spool for a film strip, flexure means comprising two parallel plates, first spacing means interconnecting said plates adjacent one end of said plates and second spacing means interconnecting said plates intermediate said one end of said plates and the other end thereof, said one end of said plates being rigidly mounted to said supporting frame and said other end of said plates supporting said film gate in line with said optical axis and said spindles on opposite sides of said film gate and imparting scanning deflections to said film gate from said neutral position in response to deflections of said flexure means, and means for selectively imparting deflections of the desired magnitude to said other end of said plates, said scanning deflections defining a surface which is substantially perpendicular to said optical axis.

3. A photographic viewing apparatus in accordance with claim 2 and wherein said first spacing means is parallel to said second spacing means and wherein said flexure plates are provided with apertures arranged between said spacing means and adjacent said spacing means to facilitate flexure of said plates adjacent said spacing means.

4. A photographic viewing apparatus in accordance with claim 1 and wherein said spacing means are parallel and said flexure plates are structurally weakened between said spacing means adjacent said spacing means to facilitate the flexure of said plates adjacent said spacing means.

5. A photographic viewing apparatus in accordance with claim 4 and wherein said deflection means comprises eccentrically mounted cam means in engagement with said flexure plates whereby rotational movement imparted to said cam means causes a deflection of said one of said interconnected ends with respect to said other of said interconnected ends of said flexure plates.

6. A photographic viewing apparatus in accordance with claim 4 and wherein said plates are provided with apertures arranged between said spacing means adjacent said spacing means to facilitate the flexure of said plates adjacent said spacing means and wherein said deflection means comprises eccentrically mounted cam means in engagement with said flexure plates whereby rotational movement imparted to said cam means causes a deflection of said one of said interconnected ends with respect to said other of said interconnected ends of said flexure plates.

References Cited in the file of this patent

UNITED STATES PATENTS

| 2,008,982 | Hopkins | July 23, 1935 |
| 2,037,705 | Chapman | Apr. 21, 1936 |
| 2,369,248 | Pratt | Feb. 13, 1945 |